United States Patent
Abramowicz et al.

[11] Patent Number: 5,489,738
[45] Date of Patent: Feb. 6, 1996

[54] ENHANCED VOLATILIZATION OF POLYCHLORINATED BIPHENYL COMPOUNDS

[75] Inventors: Daniel A. Abramowicz, Ballston Spa; Youssef El-Shoubary, Clifton Park; Bang M. Kim, Schenectady; Andrew P. Shapiro, Schenectady; Norman Z. Shillling, Schenectady, all of N.Y.

[73] Assignee: General Electric Company, Schenectady, N.Y.

[21] Appl. No.: 302,301

[22] Filed: Sep. 8, 1994

[51] Int. Cl.$^6$ .............. A62D 3/00; B09C 1/06; B09C 1/08
[52] U.S. Cl. .............. 588/249; 405/128; 588/209
[58] Field of Search .............. 405/128; 588/207, 588/209, 213, 214, 249

[56] References Cited

U.S. PATENT DOCUMENTS

| | | | |
|---|---|---|---|
| 4,699,667 | 10/1987 | Walsh | 588/209 |
| 4,715,965 | 12/1987 | Sigerson et al. | 588/209 X |
| 5,052,858 | 10/1991 | Crosby et al. | 405/128 |
| 5,152,844 | 10/1992 | Wilwerding et al. | 405/128 X |
| 5,253,597 | 10/1993 | Swanstrom et al. | 110/346 |
| 5,414,203 | 5/1995 | Fox | 588/209 X |
| 5,416,248 | 5/1995 | Matsumoto et al. | 588/249 |
| 5,430,232 | 7/1995 | El-Shoubary et al. | 588/209 |

FOREIGN PATENT DOCUMENTS

| | | |
|---|---|---|
| 2046096 | 1/1992 | Canada . |

*Primary Examiner*—George A. Suchfield
*Attorney, Agent, or Firm*—James Magee, Jr.

[57] ABSTRACT

This invention provides a method or process for separating an organic chlorinated contaminant such as polychlorobiphenyl from an inert porous material which comprises admixing the material with an effective amount of a volatilizable organic liquid in which the contaminant is soluble, heating the admixture under vacuum to a temperature above the boiling point of the organic liquid but below the decomposition temperature of the organic liquid and the contaminant, while maintaining a flow of an inert sweep gas through the porous material, and collecting the vapors for further treatment which includes recovery of the organic liquid for reuse in the decontamination of soil and other porous materials. Recovery of the organic liquid is achieved by passing the vapors from the separation step through a bed of activated carbon at a temperature above the vaporization temperature of the organic liquid. The carbon selectively adsorbs and holds the contaminant while the organic liquid in vapor form passes through and is recovered by condensation and recirculated to enhance decontamination of additional material.

8 Claims, No Drawings

ENHANCED VOLATILIZATION OF POLYCHLORINATED BIPHENYL COMPOUNDS

This invention is directed to decontamination of soils and other particulate materials such as soil, sand, gravel, crushed concrete, sludges, sediments and the like by removal of volatile and semi-volatile organic compounds, particularly halogenated compounds, such as polychlorinated biphenyl compounds and more particularly to decontamination of such materials by means of in-situ or ex-situ thermal desorption and volatilization of the contaminant compounds from the contaminated material in the presence of desorption promoting additives which are then selectively separated from the organic contaminant.

BACKGROUND OF THE INVENTION

Thermal desorption of polychlorinated biphenyl and other volatile organic compounds from porous matrices such as soil or concrete can be achieved by various methods of heating the matrix by steam or hot gases or by direct application of heat to the matrix assisted by vacuum, gas purging, and the like.

U.S. Pat. No. 5,253,597 discloses a high vacuum assisted volatilization method and apparatus for low heat removal of polychlorinated biphenyl from soils and sludge. Polychlorinated biphenyl compounds removal by incineration and pyrolysis under low vacuum are also known. The temperature at which such processes are conducted generally depends on the nature of the contaminated material and the volatility of the target contaminant as well as other components of the material.

Another thermal desorption process involves treatment of a heated slurry with a mixture of an alkaline material and a sulfoxide Countercurrent stripping with a vapor at temperatures below the boiling point of the contaminants is also used.

SUMMARY OF THE INVENTION

In its broad aspects the invention comprises a process for desorption of volatile and semi-volatile organic contaminants such as polychlorinated biphenyl compounds, and halogenated hydrocarbons, such as trichloroethylene, from inert porous materials such a soils, sand, concrete, sludges, and the like by desorption and volatilization in the presence of an organic additive which enhances desorption and volatilization of the contaminant. Effective additives are hydrocarbons and oils which solublize the contaminant or which promote desorption of the contaminant from the soil and volatilization of the target contaminant. Effective additives have boiling points below the boiling point of the contaminant to be removed.

The additive is then separated from the organic contaminant by selectively adsorbing the contaminant on a carbon sorbant. The additive passes through the sorbant and is recirculated into material being decontaminated.

The desorption is enhanced with respect to temperature or the time required to reduce the concentration of the contaminant to an acceptable level.

In preferred embodiments of the process of this invention the desorbtion and volatilization is carried out under reduced pressure and in the presence of a sweep gas such as nitrogen, carbon dioxide, or steam, or combustion gas.

Preferred compositions which can be used in the practice of this invention are non-toxic non-hazardous materials such as glycerin, kerosene, tung oil, mineral oil, cottonseed oil, linseed oil, and pine oil. The process of this invention can be used with any convenient apparatus and means for admixing the oil with the material to be cleaned and heating the material to a temperature sufficient to achieve the desired degree of desorption. Rotary kilns and furnaces, heating blankets, or thermal energy delivery devices such as microwave generators can be adapted for use in apparatus designed to carry out the process.

This invention provides a method or process for separating an organic chlorinated contaminant such as polychlorobiphenyl from an inert porous material which comprises admixing the material with an effective amount of a volatilizable organic liquid in which the contaminant is soluble, heating the admixture under vacuum to a temperature above the boiling point of the organic liquid but below the decomposition temperature of the organic liquid and the contaminant, while maintaining a flow of an inert sweep gas through the porous material, and collecting the vapors for further treatment which includes recovery of the organic liquid for reuse in the decontamination of soil and other porous materials. Recovery of the organic liquid is achieved by passing the vapors from the separation step through a bed of activated carbon at a temperature above the vaporization temperature of the organic liquid. The carbon selectively adsorbs and holds the contaminant while the organic liquid in vapor form passes through and is recovered by condensation and recirculated to enhance decontamination of additional material.

DESCRIPTION OF THE INVENTION

Polychlorinated biphenyl compounds can be efficiently desorbed and separated from porous materials such as sand, concrete, soil, and the like by a process which comprises admixing the contaminated material with an oil or hydrocarbon additive in which the contaminant is soluble and then removing the contaminant and the oil additive from the material by heating the admixture to a temperature which is slightly above the vaporization temperature of the oil and the contaminant at a pressure less than atmospheric pressure. As a general rule the additive is admixed with the material after a preliminary dewatering or drying procedure, if needed, which removes excess water to facilitate handling. Drying of the material is unnecessary and should be avoided.

The desorption technique can be practiced on either in-situ or ex-situ materials. Both of these techniques are well known to those dealing with decontamination of porous or particulate materials.

Illustrative oils which can be used to desorb organic contaminants from soils and soil-like material and which can then be separated from the contaminant by carbon adsorption include non-toxic non-hazardous oils such as tung oil, mineral oil, glycerin, cottonseed oil, linseed oil, kerosene, menhaden oil, pine oil and the like. Such oils can be used to desorb and volatilize the various congeners of polychlorinated biphenyls, naphthalene, dichlorobenzene, pentachlorophenol, and the like.

In general, the oils are used in amounts sufficient to permit desorption of substantially all of the target contaminant from the particulate porous material and maintain it in solution or suspension until volatilized out of the admixture. Generally amounts of about 1 to about 12 and preferably about 3 to 6 weight percent, based on the weight of material being treated, will be satisfactory. The use of excess additive may increase the residence time needed to achieve the degree of cleaning required. The oils can be admixed with the contaminated material continuously or batch-wise depending on the apparatus used to achieve decontamination.

It has been found advantageous to carry out the heating and volatilization of the target contaminant under reduced pressure and with introduction of an inert sweep gas such as nitrogen or carbon dioxide. The sweep gas percolates through the soil and carries the additive and contaminant vapors along. The flow rate of the sweep gas is not critical so long as there is sufficient flow to carry the contaminant vapors. Generally, flow rates of about 0.01 to about 0.06 cubic feet per hour have been found to be suitable.

Pressures in the range of about 200 to about 450 mm of mercury are effective for volatilization at temperatures above the boiling point of the additive but below the boiling point of the polychlorinated biphenyl compounds. Temperatures in the range of about 200° C. to about 350° C.

In general, a residence time of at least about four minutes at a temperature above the boiling point of the oil additive will reduce the concentration of contaminant to acceptable levels.

The process of this invention is suitable for use with natural soils which contain normal amounts of moisture. In general moisture contents in the range of about 5 to 25 weight percent can be treated without need for dewatering.

Separation of the contaminant from the gas stream is accomplished by passing the gas stream through a bed or beds of activated carbon which selectively fixes the contaminant but passes the oil additive, water vapor, sweep gas, or the like. The oil-containing gas stream is the passed by conventional means to a recycle circuit for reuse as a desorption enhancing additive in the continued decontamination procedure.

It has been found that activated carbon will selectively adsorb and hold polychlorobiphenyl at temperatures between about 100° C. and about 200° C. The oil vapors pass through the carbon bed to a suitable condenser, and, if needed, water separation means, such as a gravity separator.

Enhancement of desorption by means of the herein described oils and additives is illustrated by the following description.

The data in Table I below, was obtained by a series of experiments in which samples, approximately 100 grams each, of soil contaminated with varying amounts of common mixtures of polychlorinated biphenyl congeners were mixed with the indicated additive in a beaker and mixed with a spatula for several minutes. The admixture was transferred to a vacuum distillation apparatus and heated, under nitrogen, to the designated temperature at the designated pressure and held for the period of time shown. After each run the sample was cooled to room temperature, stored, and eventually analyzed for total POLYCHLORINATED BIPHENYL COMPOUNDS content by EPA test method 8080.

TABLE 1

| RUN # | ADDITIVE | POLYCHLORINATED BIPHENYL COMPOUNDS (PPM) | TEMP (C) | VACUUM (mm Hg) | TIME AT TEMP. (min.) | CHLORINATED BIPHENYL COMPOUNDS' FINAL ppm |
|---|---|---|---|---|---|---|
| 4 | None | 8102 | 200 | 10 | 30 | 4144 |
| 5 | None | 8102 | 200 | atm. | 30 | 7594.9 |
| 52 | None | 26,000 | 300 | 200 | 0 | 2700 |
| 102 | None | 2500 | 300 | 200 | 20 | 830 |
| 7 | 1% glycerin | 8102 | 300 | atm. | 30 | 6.6 |
| 10 | 10% glycerin | 8102 | 200 | 5 | 30 | 960.6 |
| 11 | 1% glycerin | 8102 | 300 | atm. | 30 | 22.7 |
| 12 | 10% glycerin | 8102 | 300 | atm. | 30 | 1.2 |
| 16 | 10% glycerin | 8102 | 300 | 5 | 30 | 2 |
| 41 | 2.7% glycerin | 25 | 235 | 200 | 0 | 2.7 |
| 58 | 5.3% glycerol | 26,000 | 330 | 200 | 0 | 5.6 |
| 59 | 5.3% glycerol | 26,000 | 345 | 200 | 0 | 22 |
| 14 | 10% pine oil | 8102 | 300 | atm. | 2 | 21.1 |
| 15 | 10% pine oil | 8102 | 200 | 10 | 30 | 294 |
| 23 | 18% pine oil | 8102 | 220 | 200 | 5 | 1219 |
| 24 | 10% pine oil | 8102 | 300 | 200 | 5 | n.d. |
| 25 | 10% pine oil | 8102 | 300 | 200 | 0 | 3.1 |
| 31 | 7% pine oil | 25 | 300 | 200 | 0 | n.d. |
| 32 | 3% pine oil | 25 | 300 | 200 | 0 | n.d. |
| 33 | 1% pine oil | 25 | 300 | 200 | 0 | n.d. |
| 75 | 4% pine oil | 2500 | 300 | 200 | 4 | 70 |
| 22 | 10% light min. oil | 8102 | 300 | atm. | 20 | 4 |
| 47 | 3.6% min. oil | 26,000 | 300 | 200 | 0 | 71 |
| 54 | 10% min. oil | 26,000 | 300 | 200 | 0 | 73 |
| 56 | 5% min. oil + 2% Water | 26,000 | 300 | 200 | 0 | 93 |
| 71 | 4% min. oil | 41 | 300 | 200 | 2 | n.d. |
| 76 | 4% min. oil | 2500 | 300 | 200 | 4 | 110 |
| 79 | 2% min. oil | 41 | 300 | 200 | 4 | n.d. |
| 80 | .8% min. oil | 41 | 300 | 200 | 4 | n.d. |
| 81 | 4% min. oil | 2500 | 300 | 300 | 4 | 130 |

TABLE 1-continued

| RUN # | ADDITIVE | POLYCHLORINATED BIPHENYL COMPOUNDS (PPM) | TEMP (C) | VACUUM (mm Hg) | TIME AT TEMP. (min.) | CHLORINATED BIPHENYL COMPOUNDS' FINAL ppm |
|---|---|---|---|---|---|---|
| 13 | 10% motor oil | 8102 | 300 | atm. | 30 | 2039 |
| 21 | 10% Linseed oil | 8102 | 300 | atm. | 30 | 1607 |
| 104 | 4% Decyl Alcohol | 520 | 300 | 200 | 4 | 4 |
| 74 | 4% Ker | 2500 | 300 | 200 | 4 | 54 |
| 48 | 5.7% menh. oil | 26,000 | 300 | 200 | 0 | 460 |
| 42 | 29% water | 8102 | 300 | 200 | 0 | 77 |

To study the effect of oil addition to soils contaminated with semivolatile hydrocarbons other than polychlorinated biphenyl compounds, soil samples were contaminated with pentachlorophenol, naphthalene, and dichlorobenzene in the amounts shown in Table 2, below. Two runs were carried out for each hydrocarbon, one with 4% by volume mineral oil and one without. The samples were heated to 300° C. under nitrogen about 400 mm. (Hg) in a rotary kiln and held at 300° C. for four minutes. Comparative results are given below.

TABLE 2

| CONCENTRATION DETECTED IN SOILS (PPM) | | | |
|---|---|---|---|
| | Feed | No Oil | 4% Mineral Oil |
| Pentachlorophenol | 260 | 105 | 1.6 |
| Naphthalene | 330 | 3 | <0.33 |
| Dichlorobenzenes | 240 | 3 | <0.33 |

The separation of pine oil and PCBs was studied using thermogravimetric and adsorption techniques. A sample of a mixture comprising polychlorobiphenyl and pine oil was loaded on the Thermogravimetic analyzer pan and ran isothermally at different temperatures to determine the effective temperature at which efficient separation between pine oil and the polychlorobiphenyl could be achieved. These experiments revealed that effective separation occurred at about 140° C.

Two further experiments were carried out. The first experiment was performed using 25 cc of pine oil contaminated with 3.5% arochlor 1260. The oil mixture was boiled and the vapors were passed over a bed comprising about 35 grams of granular activated carbon. The carbon bed was kept at 140° C. to 150° C. and a vacuum of about 0.5 atmosphere throughout the experiment. The vapors that passed through the carbon were then condensed and analyzed. A sample of the carbon from the bed was also analyzed. The results showed that the carbon contained about 17,000 ppm by weight of polychlorobiphenyl and the pine oil contained about 120 ppm.

The second experiment was performed using a sample comprising about 300 grams of soil contaminated with about 8000 ppm by weight of arochlor 1260 was admixed with about 8 weight percent pine oil. The mixture was heated to about 200° C. in nitrogen atmosphere and under 0.5 mm Hg vacuum. The produced vapors passed through a granular activated carbon bed containing 23 grams of carbon. The carbon temperature ranged from 140° C. to 190° C. The vapors that passed through the carbon bed were condensed and the condensate and the carbon were analyzed. The results showed that the carbon contained 20 ppm PCBs and the pine oil condensate contained less than 2 ppm of total PCBs. This confirms that the carbon will selectively adsorb and hold polychlorobiphenyls at elevated temperatures.

What is claimed is:

1. A method for decontaminating an inert porous material by removal of polychlorinated biphenyl compounds from an inert porous material which comprises admixing the material with an effective amount of a volatilizable organic liquid in which the polychlorinated biphenyl compounds are soluble, heating the admixture under vacuum to a temperature above the boiling point of the organic liquid while maintaining a flow of an inert sweep gas, passing the vapors through a bed of activated carbon to separate the organic liquid from the polychlorinated biphenyl, condensing the vapors and recirculating the organic liquid to the inert porous material.

2. A method according to claim 1 in which the organic liquid is an oil and the admixture is heated to a temperature between about 200° C. and 350° C. and the sweep gas is nitrogen.

3. A method according to claim 2 in which the oil is selected from the group consisting of pine oil and mineral oil.

4. A method according to claim 1 in which the organic liquid is kerosene.

5. A method for decontaminating soil which is contaminated with polychlorobiphenyl which comprises admixing with the contaminated soil an effective amount of a volatilizable organic liquid in which the contaminant is soluble, heating the admixture under vacuum to a temperature above the boiling point of the organic liquid while maintaining a flow of an inert sweep gas, passing the vapors through a bed of activated carbon to separate the organic liquid from the polychlorinated biphenyl, condensing the vapors of organic liquid and recirculating the organic liquid to the contaminated soil.

6. A method according to claim 5 in which the organic liquid is pine oil, the admixture is heated to a temperature of about 200° C. to 350° C., the vacuum is from about 300 to 450 mm of mercury, and the inert sweep gas is nitrogen.

7. A method according to claim 5 in which the effective amount of the organic liquid is from about 1 to about 12 percent by weight, based on the weight of the soil.

8. The method according to claim 5 in which the effective amount is from about 3 to about 6 percent by weight, based on the weight of the soil.

* * * * *